(12) United States Patent
Martel et al.

(10) Patent No.: US 10,747,908 B2
(45) Date of Patent: Aug. 18, 2020

(54) SECURE CIRCUIT CONTROL TO DISABLE CIRCUITRY

(71) Applicant: Apple Inc., Cupertino, CA (US)

(72) Inventors: Pierre-Olivier J. Martel, Mountain View, CA (US); Jeffrey R. Wilcox, San Jose, CA (US); Ian P. Shaeffer, Los Gatos, CA (US); Andrew D. Myrick, Los Altos, CA (US); Robert W. Hill, Los Gatos, CA (US); Tristan F. Schaap, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/128,396

(22) Filed: Sep. 11, 2018

(65) Prior Publication Data

US 2019/0026501 A1 Jan. 24, 2019

Related U.S. Application Data

(63) Continuation-in-part of application No. 15/720,736, filed on Sep. 29, 2017.
(Continued)

(51) Int. Cl.
*G06F 21/32* (2013.01)
*G06F 21/76* (2013.01)
*G06F 21/81* (2013.01)

(52) U.S. Cl.
CPC .............. *G06F 21/76* (2013.01); *G06F 21/32* (2013.01); *G06F 21/81* (2013.01); *G06F 2221/2111* (2013.01)

(58) Field of Classification Search
CPC .......... G06F 21/76; G06F 21/74; G06F 21/81; G06F 21/71; G06F 21/57; G06F 21/62;
(Continued)

(56) References Cited

U.S. PATENT DOCUMENTS

| 5,708,715 A | 1/1998 | Vicard |
| 8,522,309 B2 | 8/2013 | Yoffe et al. |

(Continued)

OTHER PUBLICATIONS

International Search Report and Written Opinion in Appl. No. PCT/US2018/035067 dated Aug. 14, 2018, 13 pages.
(Continued)

*Primary Examiner* — Khoi V Le
(74) *Attorney, Agent, or Firm* — Kowert, Hood, Munyon, Rankin & Goetzel, P.C.

(57) ABSTRACT

Techniques are disclosed in which a secure circuit controls a gating circuit to enable or disable other circuitry of a device (e.g., one or more input sensors). For example, the gating circuit may be a power gating circuit and the secure circuit may be configured to disable power to an input sensor in certain situations. As another example, the gating circuit may be a clock gating circuit and the secure circuit may be configured to disable the clock to an input sensor. As yet another example, the gating circuit may be configured to gate a control bus and the secure circuit may be configured to disable control signals to an input sensor. In some embodiments, hardware resources included in or controlled by the secure circuit are not accessible by other elements of the device, other than by sending requests to a predetermined set of memory locations (e.g., a secure mailbox).

16 Claims, 8 Drawing Sheets

Related U.S. Application Data

(60) Provisional application No. 62/514,727, filed on Jun. 2, 2017.

(58) Field of Classification Search
CPC .............. G06F 1/3237; G06F 1/3287; G06F 2221/2141; G06F 1/2151; G06F 1/2111; H04L 63/107; H04L 63/0861; H04L 63/108; H01L 23/57
See application file for complete search history.

(56) References Cited

U.S. PATENT DOCUMENTS

| | | | |
|---|---|---|---|
| 8,775,757 B2 | 7/2014 | Polzin et al. | |
| 8,832,465 B2 | 9/2014 | Gulati et al. | |
| 8,924,708 B2 | 12/2014 | Yoffe et al. | |
| 9,043,632 B2 | 5/2015 | Machnicki et al. | |
| 9,047,471 B2 | 6/2015 | Polzin et al. | |
| 9,235,729 B2 * | 1/2016 | Robison | G06F 21/81 |
| 9,310,866 B2 | 4/2016 | Koyama et al. | |
| 9,419,794 B2 | 8/2016 | Polzin et al. | |
| 2011/0117903 A1 | 5/2011 | Bradley | |
| 2014/0089617 A1 * | 3/2014 | Polzin | G06F 12/14 |
| | | | 711/163 |
| 2014/0089682 A1 * | 3/2014 | Gulati | G06F 21/575 |
| | | | 713/192 |
| 2014/0089712 A1 * | 3/2014 | Machnicki | G06F 1/26 |
| | | | 713/324 |
| 2014/0282819 A1 | 9/2014 | Sastry et al. | |
| 2015/0127549 A1 | 5/2015 | Khan | |

OTHER PUBLICATIONS

IInternational Preliminary Report on Patentability in Appl. No. PCT/US2018/035067 dated Jul. 26, 2019, 9 pages.

* cited by examiner

SECURE CIRCUIT CONTROL TO DISABLE CIRCUITRY

This application is a continuation-in-part of U.S. patent application Ser. No. 15/720,736, filed on Sep. 29, 2017, which claims the benefit of U.S. Provisional Application No. 62/514,727, filed on Jun. 2, 2017, each of which is incorporated by reference herein in their respective entireties.

BACKGROUND

Technical Field

This disclosure relates generally to enabling and disabling circuitry in computing devices, and, more specifically, to techniques for securely disabling circuitry.

Description of the Related Art

Mobile devices such as cell phones and laptop computers often include recording devices such as cameras and microphones. These recording sensors may be undesirable in various contexts where security or privacy is important. Permanently disabling the sensors, however, may interfere with desired functionality in other contexts.

SUMMARY

The present disclosure describes techniques in which a secure circuit controls a gating circuit to enable or disable other circuitry of a device (e.g., one or more input sensors). For example, the gating circuit may be a power gating circuit and the secure circuit may be configured to disable power to an input sensor in certain situations. As another example, the gating circuit may be a clock gating circuit and the secure circuit may be configured to disable the clock to an input sensor in certain situations. As yet another example, the gating circuit may be configured to gate a control bus and the secure circuit may be configured to disable control signals to an input sensor in certain situations.

In some embodiments, the device is configured such that other elements of the device cannot enable the one or more input sensors when they are disabled by the secure circuit. In some embodiments, the secure circuit is also configured to control user authentication, which may include biometric authentication techniques. In some embodiments, hardware resources included in or controlled by the secure circuit are not accessible by other elements of the device, other than by sending requests to a predetermined set of memory locations (which may implement a secure mailbox for communications with the secure circuit). In various embodiments, the disclosed techniques may reduce or eliminate illicit recording in certain settings.

Figure 1:
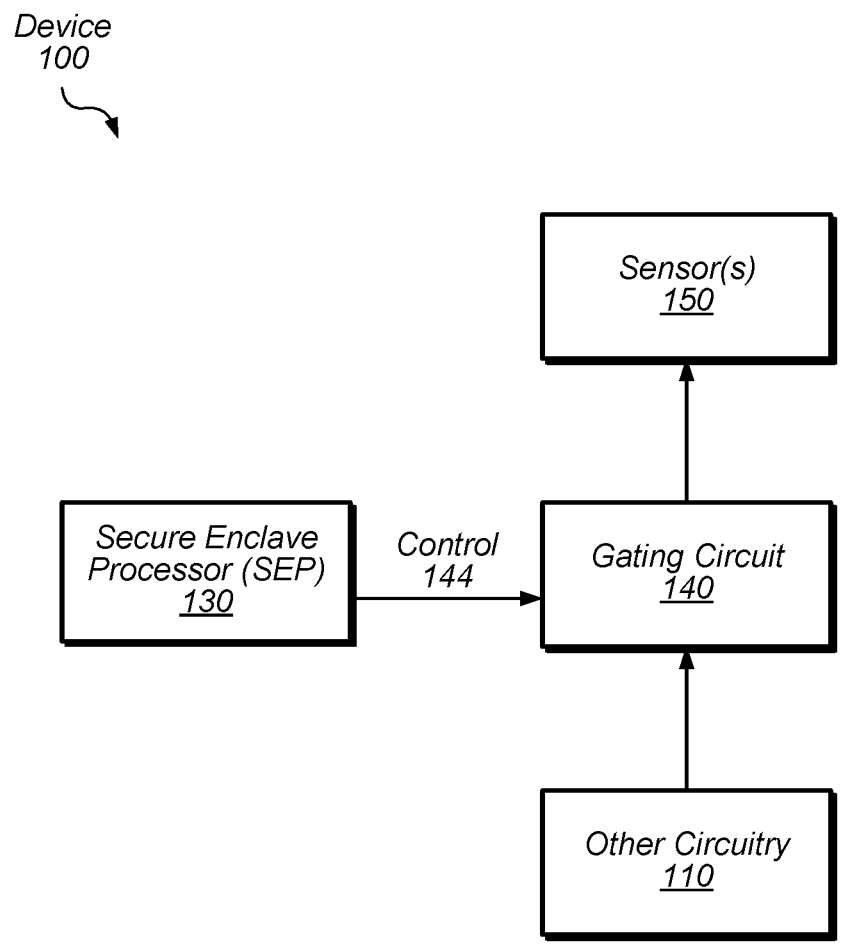
FIG. 1 is a block diagram illustrating an exemplary computing device that includes a secure circuit and gating circuit, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," "modules," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to perform an authentication" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first user and a second user. The term "first" is not limited to the initial user of the device. The term "first" may also be used when only one user of the mobile device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In disclosed embodiments, a secure circuit is configured to enable or disable one or more sensors such that, when the secure circuit disables the sensor(s), other circuitry in a device cannot enable the sensor(s). This may allow sensors to be disabled in secure locations without permanently disabling the sensors (although the secure circuit may also be configured to permanently or semi-permanently disable sensors, in some embodiments).

As used herein, the term "secure circuit" refers to a circuit that protects an isolated, internal resource from being directly accessed by an external circuit. This internal resource may be memory that stores sensitive data such as personal information (e.g., biometric information, credit card information, etc.), encryptions keys, random number generator seeds, etc. This internal resource may also be circuitry that performs services/operations associated with sensitive data. SEP 130, discussed in further detail below, is one exemplary embodiment of a secure circuit. In various embodiments, hardware resources included in or controlled by the secure circuit are not accessible by other elements of the device, other than by sending requests to a predetermined subset of circuitry in the secure circuit (e.g., a secure mailbox).

Although input sensors are discussed herein for purposes of explanation, this is not intended to limit the scope of the present disclosure. The disclosed techniques may be implemented to enable/disable various types of circuitry, including network interfaces, I/O ports, peripheral devices, storage elements, etc.

FIG. 1 is a block diagram illustrating an exemplary device 100, according to some embodiments. In the illustrated embodiment, device 100 includes other circuitry 110, secure enclave processor (SEP) 130, gating circuit 140 and sensor (s) 150.

Circuitry 110, in various embodiments, is configured such that it cannot enable sensor(s) 150 when SEP 130 disables the sensor(s) using control signal 144. Other circuitry 110 may be a power supply, central processing unit (CPU), clock unit, peripheral, etc. Various examples of other circuitry 110 are discussed herein, but these examples are not intended to limit the scope of the present disclosure; other types of circuitry 110 may be used in various embodiments.

SEP 130, in the illustrated embodiment, is a secure circuit configured to manage control signal 144 to enable or disable sensor(s) 150 via gating circuit 140. In some embodiments, device 100 is configured such that hardware resources in SEP 130 are not accessible to other elements of device 100 (e.g., circuitry 110). In some embodiments, SEP 130 includes a subset of predetermined circuitry that is accessible to circuitry 110 (e.g., a set of predetermined memory locations configured to store messages from circuitry 110). This subset may be used as a secure mailbox for messages from circuitry 110, as discussed in further detail below. In other embodiments, any of various appropriate communication mechanisms may be implemented using the subset of predetermined circuitry in SEP 130. Therefore, circuitry 110 may indirectly access hardware and functionality controlled by SEP 130, using the predetermined memory locations, if SEP 130 grants permission. For example, circuitry 110 may request that SEP 130 enable sensor(s) 150, but the SEP 130 may be configured to deny such requests in certain circumstances.

Gating circuit 140, in the illustrated embodiment, is configured to either provide or block signals to sensor(s) 150 based on control signal 144. For example, gating circuit 140 may be configured to gate the signaling from circuitry 110 when control signal 144 has a first value and provide signaling from circuitry 110 when control signal 144 has a second value. In some embodiments, other gating circuits are included in device 100, e.g., such that circuitry 110 can also disable sensor(s) 150. In various embodiments, however, other elements in device 100 cannot enable a sensor when SEP 130 has disabled the sensor. For example, gating circuit 140 may be the last gating circuit driving the sensor such that circuit 140 cannot be bypassed.

Sensor(s) 150 may include one or more sensors such as microphones, cameras, thermometers, satellite navigation elements (e.g., GPS modules), altimeters, infrared sensors, accelerometers, thermal sensors, biometric sensors, etc. Although FIG. 1 shows a single gating circuit for multiple sensors, gating for sensors may be controlled on a per-sensor or per-group granularity. Therefore, SEP 130 is configured, in some embodiments, to gate some sensors but not all sensors included in device 100 at certain times. In other embodiments, element 150 may be non-sensor circuitry, such as an input/output (I/O) interface, a network interface, a storage element, etc. In some embodiments, gating for non-sensor circuitry may be controlled at various levels of granularity, such that desired portions of a given type of circuitry can be separately enabled or disabled or an entire type of circuitry may be controlled. For example, a first set of I/O ports may be separately controlled such that they may be disabled while a second set of I/O ports are disabled. At another level of granularity, however, both the first and second sets of I/O ports may be enabled or disabled together.

Figure 2A:
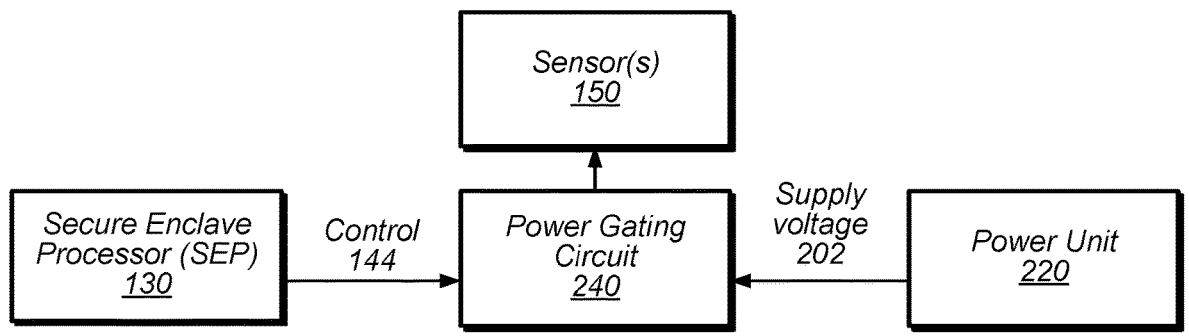
FIG. 2A is a block diagram illustrating an exemplary embodiment with power gating circuitry, according to some embodiments.

FIG. 2A is a block diagram illustrating an exemplary portion of device 100 with a power gating circuit. In the illustrated embodiment, power unit 220 is configured to provide a supply voltage 202 to sensors 150 when enabled by power gating circuit 240 (one example of gating circuit 140). Exemplary implementations of power gating circuit

240 are discussed below with reference to FIGS. 2F and 2G. Power unit 220 may be a power management unit or a power supply unit, for example. Power unit 220 may additionally be configured to power circuitry 110, SEP 130, and/or other processing elements.

Figure 2B:
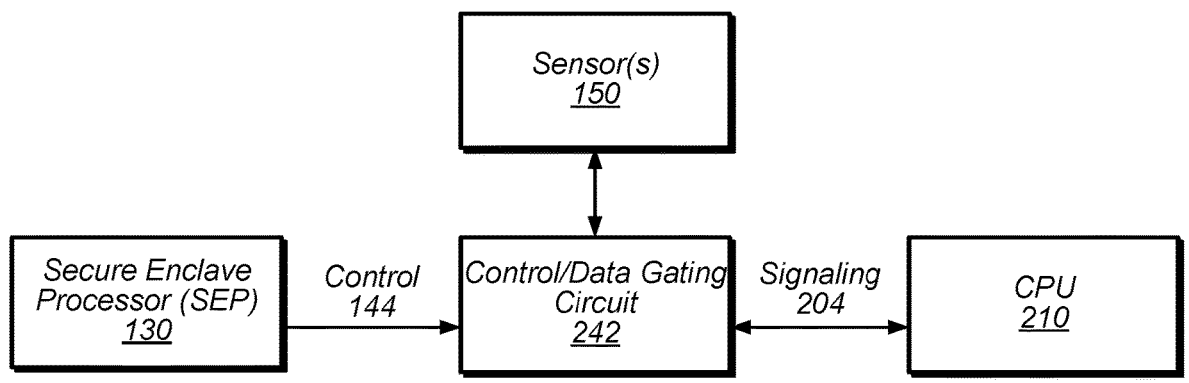
FIG. 2B is a block diagram illustrating an exemplary embodiment with control and/or data gating circuitry, according to some embodiments.

FIG. 2B is a block diagram illustrating an exemplary portion of device 100 with a control and/or data gating circuit. In embodiments in which gating circuit 242 is configured to gate control signals, CPU 210 is configured to provide control signaling 204 to sensor(s) 150 when enabled by gating circuit 242 but cannot provide controlling signaling to sensor(s) 150 when disabled by gating circuit 242. CPU 210 is one example of circuitry 110. In embodiments in which gating circuit 242 is configured to gate data signals, sensor(s) 150 are configured to provide sensor data signaling 204 to CPU 210 when enabled by gating circuit 242, but cannot provide sensor data when disabled by gating circuit 242. In some embodiments, gating circuit 242 is configured to perform both data and control gating. Data and control information may be transmitted using the same bus or different buses, in various embodiments. In various embodiments, disclosed techniques for disabling circuitry may similarly be used to enable previously-disabled circuitry, e.g., under control of a secure circuit.

CPU 210, in some embodiments, is an untrusted processor. For example, CPU 210 may be a conventional processor on which malicious applications may be executed. In some embodiments, CPU 210 may include security hardware and/or may execute anti-virus security software, for example, but still may be considered untrusted from the point of view of SEP 130. In the illustrated embodiment, CPU 210 is configured to communicate with sensor(s) 150. For example, CPU 210 may send commands to begin and end recording and may access results of the recording by one or more sensors. Such commands may be sent via the same interface as sensor data or via a separate interface. In embodiments with separate interfaces for commands and data, control gating circuit 242 may be configured to gate one or both of the interfaces.

Note that the control signaling 204 may be signaling that requests certain sensor functionality, e.g., requests capture of input data. Gating such signaling may disable the functionality. In other embodiments, control signaling 204 may be signaling that enables or disables a particular sensor as a whole (e.g., by power or clock gating, for example, or putting the sensor into a particular mode). Gating such signaling may prevent other circuitry from changing the status of the sensor(s) from enabled to disabled or vice versa, for example.

Figure 2C:
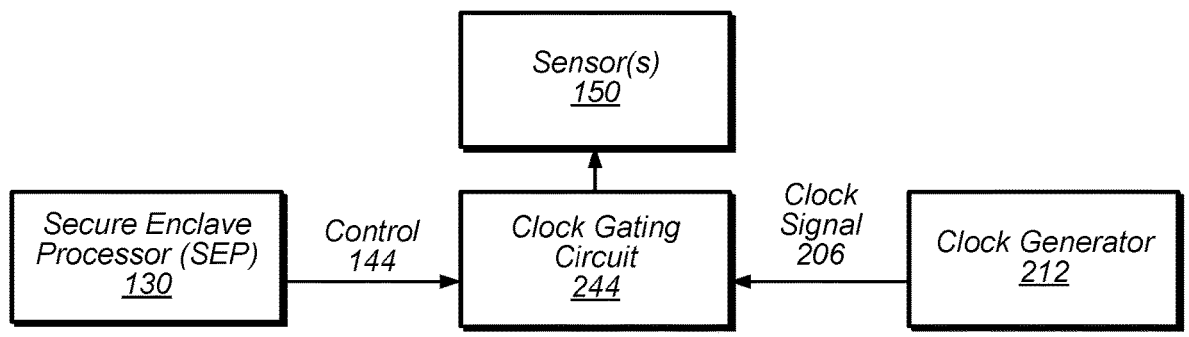
FIG. 2C is a block diagram illustrating an exemplary embodiment with clock gating circuitry, according to some embodiments.

FIG. 2C is a block diagram illustrating an exemplary portion of device 100 with a clock gating circuit. In the illustrated embodiment, clock generator 212 is configured to provide a clock signal 206 to sensor(s) 150 when enabled by clock gating circuit 244. In embodiments in which sensor(s) 150 rely on a clock signal for correct operation, gating the clock signal 206 may disable the sensor(s).

In some embodiments, multiple ones of elements 240, 242, and/or 244 may be included in device 100 which may provide SEP 130 with multiple ways of enabling or disabling sensor(s) 150.

Figure 2D:
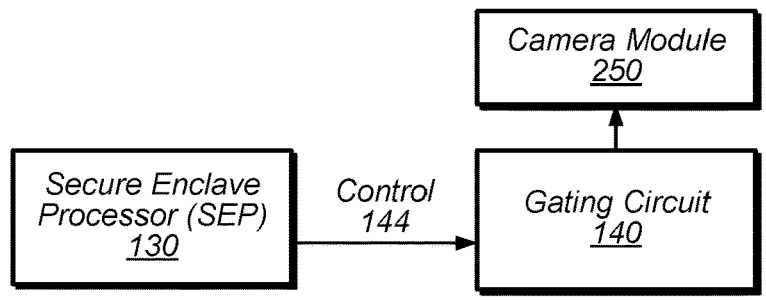
FIG. 2D is a block diagram illustrating an exemplary portion of a computing device that includes a camera module.

FIG. 2D is a block diagram illustrating an exemplary portion of device 100 in an embodiment in which sensor(s) 150 includes a camera module 250. In some embodiments, device 100 may include multiple camera units, which may be gated separately by SEP 130.

For example, SEP 130 may implement multiple camera modes in which different sets of cameras are enabled.

Figure 2E:
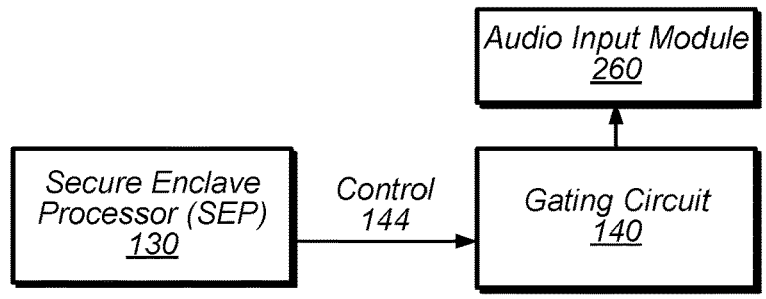
FIG. 2E is a block diagram illustrating an exemplary portion of a computing device that includes an audio input module.

FIG. 2E is a block diagram illustrating an exemplary portion of device 100 in an embodiment in which sensor(s) 150 includes an audio input module 260.

Figure 2F:
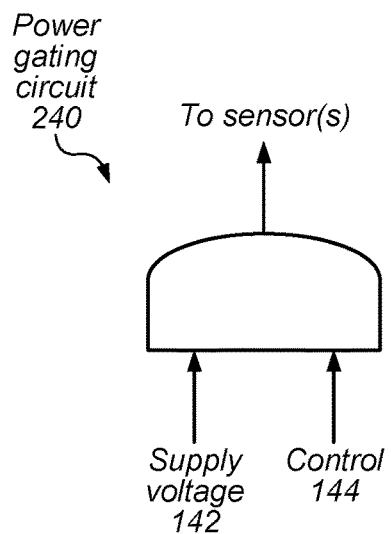
FIG. 2F is a block diagram illustrating an exemplary AND gate implementation of a power gating circuit, according to some embodiments.

FIG. 2F is a diagram illustrating an exemplary AND gate implementation of power gating circuit 240, according to some embodiments. In the illustrated embodiment, control signal 144 is one input to the AND gate and supply voltage 142 is another input to the AND gate. In this embodiment, control signal 144 is a binary signal where an assertion enables power to sensor(s) 150 and a de-assertion value disables power to sensor(s) 150. In some embodiments, additional control signals (not shown) may also be used as inputs to the AND gate and these signals may disable power when they are low. In such embodiments, however, these signals cannot enable power when control signal 144 is low because the output of the AND gate will be low if any input is low.

Figure 2G:
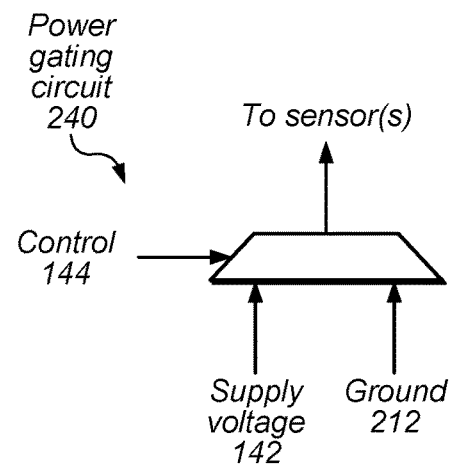
FIG. 2G is a block diagram illustrating an exemplary multiplexer (MUX) implementation of a power gating circuit, according to some embodiments.

FIG. 2G is a diagram illustrating an exemplary multiplexer (MUX) implementation of power gating circuit 240. In the illustrated embodiment, control signal 144 is the select signal for the MUX such that a first value of the control signal 144 disables power to sensor(s) 150 by passing ground to the output of the MUX and a second value of control signal 144 enables power by passing supply voltage 142 to the output of the MUX. Note that an AND gate or MUX may be used similarly to implement control gating circuit 242 and/or clock gating circuit 244, in some embodiments.

In some embodiments, power gating circuit 240 is implemented using a transistor, e.g., a field effect transistor (FET) inserted between a supply voltage rail and circuitry being powered, such that turning off the transistor cuts off power from the circuitry. Control signal 144 may be coupled to the control terminal of the transistor (e.g., the gate). The transistor may be sized and configured to have low leakage power.

The embodiments of FIGS. 2F and 2G are shown for purposes of illustration but are not intended to limit the scope of the present disclosure. In other embodiments, any of various appropriate circuitry may be used to implement the disclosed logic. In some embodiments, SEP 130 may itself include a power management unit or clock generator and may internally determine whether to provide power or a clock signal to sensor(s) 150.

Figure 3:
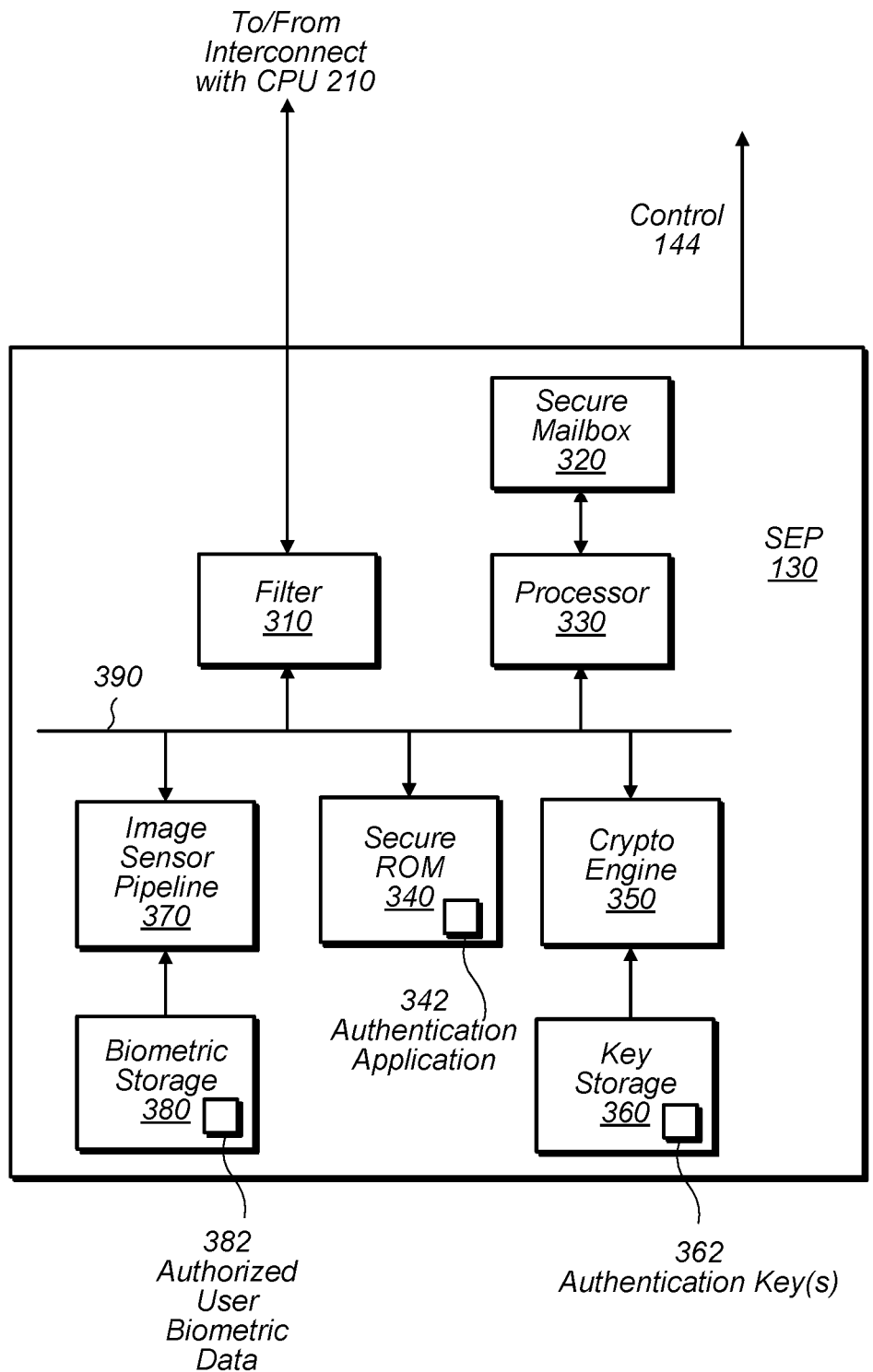
FIG. 3 is a block diagram illustrating an exemplary secure circuit implementation, according to some embodiments.

FIG. 3 is a block diagram illustrating an exemplary SEP 130, according to some embodiments. In the illustrated embodiment, SEP 130 includes filter 310, secure mailbox 320, processor 330, secure ROM 340, cryptographic engine 350, a key storage 560, an image sensor pipeline 370, and biometric storage 380, coupled together via an interconnect 390. In some embodiments, SEP 130 may include more (or fewer) components than shown in FIG. 3. As noted above, SEP 130 is a secure circuit that protects an internal resource such as user authentication keys 362 and/or authorized user biometric data 382. As discussed below, SEP 130 implements a secure circuit through the use of filter 310 and secure mailbox 320, in the illustrated embodiment. In the illustrated embodiment, SEP 130 is also configured to assert control signal 144 to control gating circuitry.

In some embodiments, using the same secure circuit to control both user authentication (e.g., by storing or controlling password and/or biometric information) and gating of sensors may substantially reduce or eliminate the ability of malicious programs executed by CPU 210 from accessing data from input sensors without authorization. In the illustrated embodiment, SEP is configured to communicate with CPU 210 (and/or other processing elements) via an interconnect coupled to filter 310.

Filter 310, in the illustrated embodiment, is circuitry configured to tightly control access to SEP 130 to increase the isolation of the SEP 130 from the rest of the computing device 100, and thus the overall security of the device 100. More particularly, in some embodiments, filter 310 is configured to permit read/write operations from a CPU 210 (or other peripherals on a fabric coupling CPU 210 and SEP 130) to enter SEP 130 only if the operations address the secure mailbox 320. Therefore, other operations may not progress from the interconnect into SEP 130, in these embodiments. Even more particularly, filter 310 may permit write operations to the address assigned to the inbox portion of secure mailbox 320, and read operations to the address assigned to the outbox portion of the secure mailbox 320. All other read/write operations may be prevented/filtered by the filter 310. Therefore, secure mailbox 320 includes predetermined memory locations that are accessible to other elements in device 100 and the remainder of the circuitry in SEP 130 is not accessible to other elements of device 100. In some embodiments, filter 310 may respond to other read/write operations with an error. In one embodiment, filter 310 may sink write data associated with a filtered write operation without passing the write data on to local interconnect 390. In one embodiment, filter 310 may supply non-secure data as read data for a filtered read operation. This data (e.g., "garbage data") may generally be data that is not associated with the addressed resource within the SEP 130. Filter 310 may supply any data as garbage data (e.g. all zeros, all ones, random data from a random number generator, data programmed into filter 310 to respond as read data, the address of the read transaction, etc.).

In various embodiments, filter 310 may only filter external read/write operations. Thus, the components of the SEP 130 may have full access to the other components of computing device 100 including CPU 210, memory, and/or sensor(s) 150. Accordingly, filter 310 may not filter responses from the interconnect that are provided in response to read/write operations issued by SEP 130.

Secure mailbox 320, in the illustrated embodiment, is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from CPU 210. The outbox may store write data from write operations sourced by processor 330. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on CPU 210 may request services of SEP 130 via an application programming interface (API) supported by an operating system of computing device 100—i.e., a requester may make API calls that request services of SEP 130. These calls may cause corresponding requests to be written to mailbox mechanism 320, which are then retrieved from mailbox 320 and analyzed by processor 330 to determine whether it should service the requests. Accordingly, this API may be used to request gating for one or more sensors, deliver biometric data to mailbox 320, request authentication of a user by verifying this information, and/or delivering an authentication result via mailbox. By isolating SEP 130 in this manner, integrity of internal hardware may be enhanced.

SEP processor 330, in the illustrated embodiment, is configured to process commands received from various sources in computing device 100 (e.g. from CPU 210) and may use various secure peripherals to accomplish the commands. Processor 330 may then execute instructions stored in secure ROM 340 such as authentication application 342 to perform an authentication of a user. For example, SEP processor 330 may execute application 342 to provide appropriate commands to image sensor pipeline 370 in order to verify biometric data. In some embodiments, application 342 may include encrypted program instructions loaded from a trusted zone in memory.

Secure ROM 340, in the illustrated embodiment, is a memory configured to store program instruction for booting SEP 130. In some embodiments, ROM 340 may respond to only a specific address range assigned to secure ROM 340 on local interconnect 390. The address range may be hardwired, and processor 330 may be hardwired to fetch from the address range at boot in order to boot from secure ROM 340. Filter 310 may filter addresses within the address range assigned to secure ROM 340 (as mentioned above), preventing access to secure ROM 340 from components external to the SEP 130. In some embodiments, secure ROM 340 may include other software executed by SEP processor 330 during use. This software may include the program instructions to process inbox messages and generate outbox messages, code to interface with other processing elements, etc.

Cryptographic engine 350, in the illustrated embodiment, is circuitry configured to perform cryptographic operations for SEP 130, including key generation as well as encryption and decryption using keys in key storage 360. Cryptographic engine 350 may implement any suitable encryption algorithm such as DES, AES, RSA, etc. In some embodiments, engine 350 may further implement elliptic curve cryptography (ECC). In various embodiments, engine 350 is responsible for decrypting traffic received from other processing elements and encrypting traffic sent to other processing elements.

Key storage 360, in the illustrated embodiment is a local memory (i.e., internal memory) configured to store cryptograph keys. In some embodiments, these keys may include keys used to establish the secure channels between SEP 130 and other processing elements. As shown, in some embodiments, these keys include authentication keys 362. These keys may also be used to verify the identity of SEP 130, e.g., by signing challenge data from other processing elements.

Image sensor pipeline 370, in the illustrated embodiment, is circuitry configured to compare biometric data captured from a user being authenticated with input biometric data of an authorized user. Similar techniques may be used for various other types of biometric authentication in addition to and/or in place of image data. In some embodiments, pipeline 370 may perform the comparison using a collection of neural networks included in pipeline 370, each network being configured to compare biometric data captured in a single frame with biometric data captured in multiple frames for an authorized user. As shown, pipeline 370 may be configured to read, from memory, biometric data, which may be protected by encryption in some embodiments or being stored in an associated part of system memory that is only accessible to SEP 130. (In another embodiment, SEP 130 may store input biometric data internally.) In various embodiments, various types of sensors may be used for biometric authentication, including fingerprint sensors, cameras for facial, body, or object recognition, sensors configured to measure other body characteristics, etc.

Note that although biometric storage 380 is included in SEP 130 in the illustrated embodiment, in other embodiments SEP 130 is configured to encrypt data 382 (e.g., using an encryption key in key storage 360) and store the encrypted data outside of SEP 130. In some embodiments, the encryption key used for such encryption never leaves SEP 130 and is unique to device 100, which may improve security of such encrypted data when stored outside of SEP 130.

Figure 4:
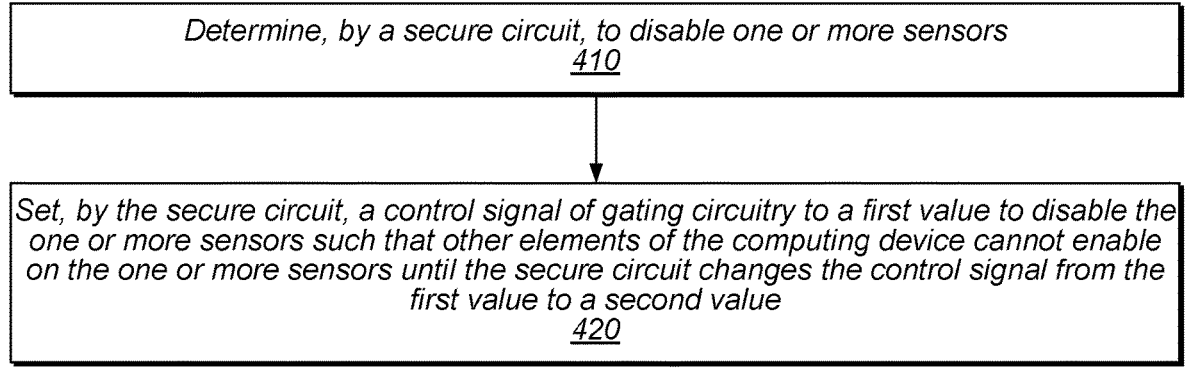
FIG. 4 is a flow diagram illustrating an exemplary method for disabling sensors by a secure circuit, according to some embodiments.

FIG. 4 is a flow diagram illustrating an exemplary method for using a secure circuit to disable one or more sensors, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, a secure circuit (e.g., SEP 130) determines to disable one or more sensors. The secure circuit may make this determination based on various events, such as a reboot of a device (e.g., into a recovery partition), a user authentication (e.g., a biometric authentication), entry or exit of a particular location (e.g., using geofencing techniques), connection to a network, implementation of a profile, expiration of a time interval, use of a device to make a payment, use of a device for physical access (e.g., to open a door using short-range wireless communications, operation of the device in a particular mode, a physical configuration of the device, etc. In some embodiments, a device that includes the secure circuit also includes a processor configured to access data generated by the one or more sensors and a gating circuit configured to provide signaling to the one or more sensors. In some embodiments, the device is configured not to allow access to hardware resources of the secure circuit other than via a predefined subset of circuitry included in the secure circuit and management of a control signal input to the gating circuit is limited to the secure circuit.

At 420, in the illustrated embodiment, the secure circuit sets a control signal of gating circuitry to a first value to disable the one or more sensors such that other elements of the computing device cannot enable on the one or more sensors until the secure circuit changes the control signal from the first value to a second value. The secure circuit may maintain the control signal at the first value until various events occur (such as one of the exemplary events discussed above with reference to method element 410).

In geofencing embodiments, SEP 130 may be configured to establish secure communications with one or more location devices (e.g., GPS modules, radios configured to establish location using triangulation or signal strength, etc.). For example, SEP 130 may verify that data from location devices is cryptographically signed to increase reliability of location data. In various embodiments, geofencing may be used to securely disable sensors in certain areas but allow the sensors to be used otherwise.

In some embodiments, SEP 130 is configured to disable one or more sensors based on a physical configuration of a device. One example of physical configuration is whether a device is open or closed. Certain notebook computer and flip phones, for example, can be opened or closed by the user. For example, SEP 130 may disable one or more microphones in response to determining that the device has closed and may not re-enable the microphones until the device has been opened. Note that, in this example, SEP 130 may not disable one or more cameras that are physically blocked due to closing of the device.

The device may be determined to be in a closed state based on detecting that a lid of the device is not open, detecting that two physical portions of the device are adjacent (e.g., portions that are not adjacent when the device is open), or using other appropriate techniques. Speaking generally, closing of a device may be indicative that a user does not intend to currently use the device. Similar techniques may be used to disable any of various types of input devices or sensors based on physical configuration. In other embodiments, similar techniques may be used to disable one or more sensors based on physical orientation, operating mode (e.g., sleep, standby, normal, high-performance, etc.), and so on.

Figure 5A:
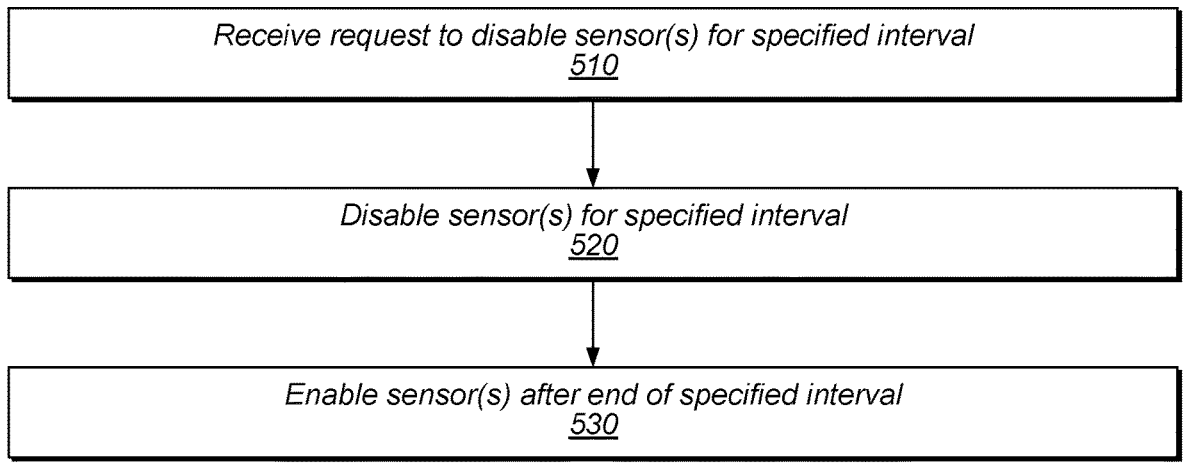
FIG. 5A is a flow diagram illustrating an exemplary method for disabling sensor(s) for a specified interval, according to some embodiments.

FIG. 5A is a flow diagram illustrating an exemplary method for handling a request to disable one or more sensors, according to some embodiments. The method shown in FIG. 5A may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, SEP 130 receives a request to disable one or more sensors for a specified time interval. In some embodiments, CPU 210 generates this request based on user input and sends the request to secure mailbox 320. In some embodiments, the request may specify a particular mode for disabling the sensors, e.g., clock gating, power gating, or control gating.

At 520, in the illustrated embodiment, SEP 130 disables the requested one or more sensors for a specified interval. This may include power gating the sensor(s), clock gating the sensor(s), gating data from the sensors, and/or gating control data to the sensors, for example. Further, although these examples of gating are discussed herein for purposes of explanation, still other gating techniques may be used in other embodiments. In some embodiments, SEP 130 may require user authentication prior to disabling the sensor(s). In some embodiments, SEP 130 may only accept requests to disable sensors from certain processing elements in device 100 and may verify the initiator of requests, e.g., by requesting cryptographic proof.

At 530, in the illustrated embodiment, SEP enables the sensor(s) after the end of the specified time interval. This may allow an entity to ensure that users do not have their sensors enabled, e.g., by requiring the users to show that they have disabled the sensors for an agreed-upon time interval.

In some embodiments, SEP 130 is configured not to enable the sensor(s) during the specified time interval regardless of user input. For example, the user may perform one or more authentication procedures, reboot the device, input various commands, etc. but SEP 130 will not allow the sensor(s) to be enabled until the end of the interval, in these embodiments. Said another way, the disablement is unconditional during a specified or predetermined time interval, in some embodiments. This may avoid situations where a user pretends to disable their sensors and later re-enables a sensor to illicitly record information.

In some embodiments, the request does not specify a time interval and SEP 130 may disable the sensor(s) indefinitely until a request to enable sensor(s) is received. In some embodiments, SEP 130 may be configured to re-enable sensor(s) after a default predetermined time interval, in the absence of an interval specified in the request.

In some embodiments, device 100 is configured to disable one or more input sensors by default. In these embodiments, a user may request to enable sensors or device 100 may be configured to automatically enable sensors in response to authentication (e.g., when the user unlocks a lock screen).

Figure 5B:
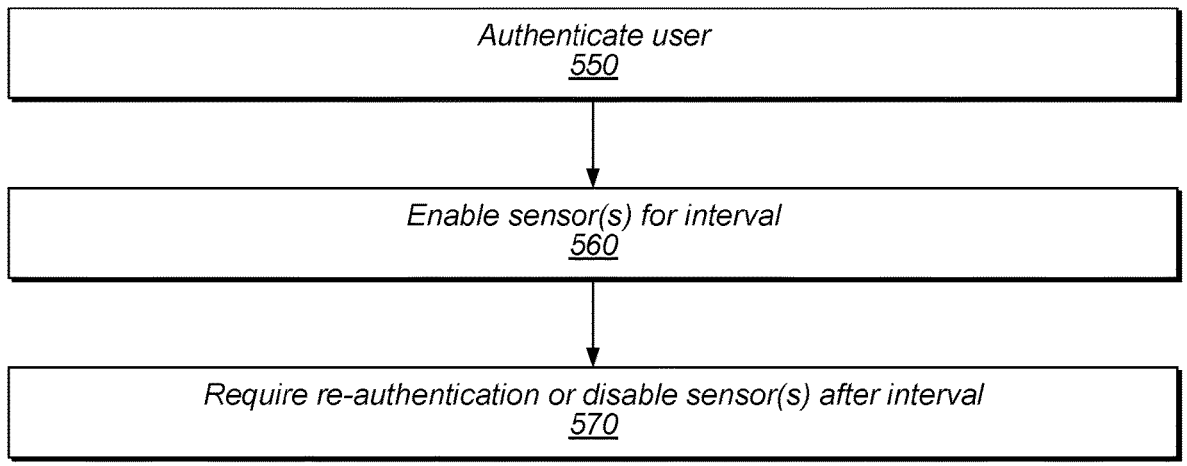
FIG. 5B is a flow diagram illustrating an exemplary method for enabling sensor(s) in response to user authentication, according to some embodiments.

FIG. 5B is a flow diagram illustrating an exemplary method for handling a request to enable one or more sensors, according to some embodiments. The method shown in FIG. 5B may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 550, in the illustrated embodiment, SEP 130 authenticates a user, e.g., using biometric authentication and/or manual entry of authentication credentials. As discussed above, the user may also explicitly request to enable one or more sensors.

At 560, in the illustrated embodiment, SEP 130 enables the one or more sensors for a time interval. For example, SEP 130 may enable power signaling, enable a clock signal, and/or enable control signaling. Note that the sensors may remain disabled, e.g., based on other control signaling from CPU 210, but SEP 130 does not prevent signals from being provided to the one or more sensors at this point.

At 570, in the illustrated embodiment, SEP 130 disables the sensors or requires re-authentication after the time interval (which may be predetermined or specified). For example, device 100 may prompt the user for a re-authentication and SEP 130 may disable the sensors after the user fails to respond within a timeout interval or fails an authentication procedure. In other embodiments, SEP 130 may simply disable the sensors without prompting for re-authentication. In some embodiments, SEP 130 may require re-authentication in response to detecting a particular type of event, e.g., even before the end of the interval.

Entities may desire to restrict recording at certain locations where they provide wireless local area network (WLAN) connectivity. In some embodiments, network components are configured to allow devices to connect to the network only if the devices implement a security profile that disables input sensors. Note that networking circuitry of device 100 may also be controlled by SEP 130, using any of the various techniques discussed herein. SEP 130 may also control various I/O ports such as universal serial bus (USB), thunderbolt, PCIe, memory card interfaces, etc.

Figure 6:
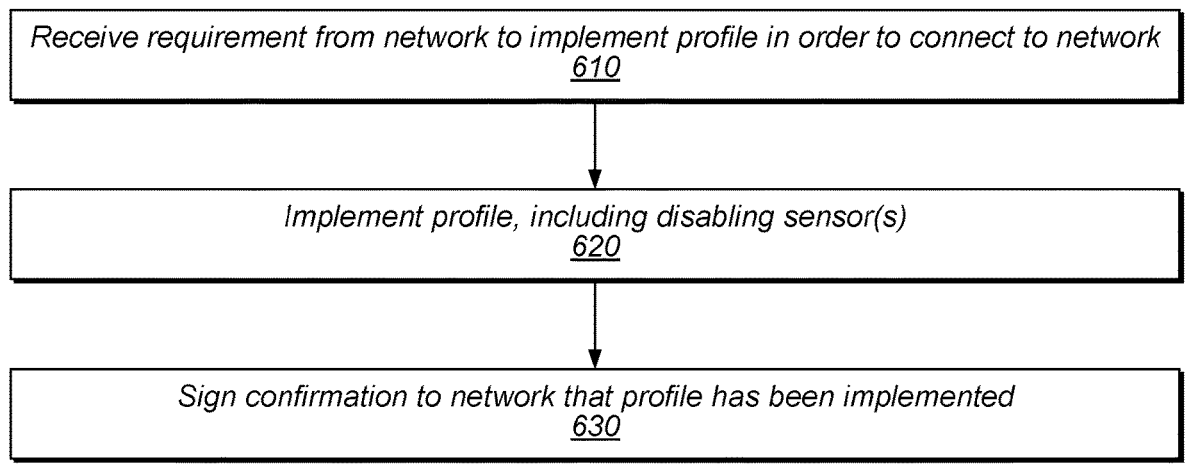
FIG. 6 is a flow diagram illustrating an exemplary method for implementing a network-imposed profile, according to some embodiments.

FIG. 6 is a flow diagram illustrating an exemplary method for enforcing a profile based on signaling from a network, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, device 100 receives information indicating a requirement from a network to implement a profile in order to connect to the network. The network may prevent device 100 from connecting until device 100 confirms that the profile has been implemented, for example.

At 620, in the illustrated embodiment, device 100 implements the profile, which includes SEP 130 disabling one or more input sensors in device 100.

At 630, in the illustrated embodiment SEP 130 signs a confirmation to the network that the profile has been implemented. For example, SEP 130 may store a unique encryption key and may use the encryption key to sign challenge information sent from the network in order to verify that the SEP 130 is from a manufacturer known to properly implement the profile. This may allow an entity to verify that wireless devices connected to their network have recording capabilities disabled, which may be useful in secure locations such as government buildings or locations where media is displayed that should not be copied such as movie theaters.

Although a profile imposed by a network is discussed above with reference to FIG. 6, similar techniques may use profiles without these network features. For example, an employer entity may require that employees implement a device profile that disables certain device functionality during working hours. The profile may be enforced indefinitely, during certain time intervals, based on device location, based on being connected to a network as discussed above, etc.

In some embodiments, SEP 130 is configured not to provide certain types of information that it controls until one or more sensors have been disabled. For example, SEP 130 may control a certificate for connecting to a network and may not provide this information to a wireless radio until input sensors have been disabled, in order to enforce a network-imposed profile. In other embodiments, SEP 130 may refuse to provide various information that it controls until it has disabled one or more sensors.

Note that a given device may be configured to perform multiple ones of the methods shown in FIGS. 4-6, e.g., in different modes of operation. For example, device 100 may be configured to operate in a secure mode in which sensors are disabled by default and perform the method of FIG. 5 and also operate in another mode in which sensors are enabled by default and perform the method of FIG. 4.

In some embodiments, SEP 130 may be configured to enable one or more input sensors only for the duration of an authentication session and disable the sensors after the authentication session. In these embodiments, SEP 130 may also disable sensors the authentication session lasts longer than a threshold time interval, which may prevent unauthorized recording by pretending to attempt an authentication session. For example, SEP 130 may enable a microphone for voice recognition authentication, a camera module for facial recognition authentication, etc. and disable the corresponding sensor after the authentication session. SEP 130 may disable the microphone/camera, however, if a voice/face is not recognized within short interval. Further, SEP 130 may enable only a subset of input sensors in device 100 for an authentication session.

In some embodiments, SEP 130 is configured to allow only certain users or types of users to enable input sensors. For example, if device 100 maintains accounts for registered users A and B, SEP 130 may be configured to enable sensors for user A but not for user B, depending on who is logged into device 100. Similarly, multiple profiles may be implemented for a given user and one or more profiles for a given user may be prevented from enabling one or more sensors.

In some embodiments, SEP 130 is configured to permanently disable one or more input sensors. For example, a user may boot device 100 in a recovery mode, which may provide an option to permanently disable the sensors. Subsequent to user input selecting such an option, SEP 130 may permanently disable the sensors (e.g., by gating one or more types of signaling to the sensors) and may be configured to refuse to re-enable the sensors thereafter. A recovery boot mode may also be used to temporarily enable or disable sensors (and may require a subsequent reboot into recovery mode to change back from enabled to disabled or vice versa).

In some embodiments, device 100 includes an indicator (e.g., a light such as an LED) to indicate to the user whether circuitry has been enabled or disabled. For example, a light of a first color may be used to indicate that recording sensors are enabled and another color may be used to indicate that recording sensors are disabled. Different colors may also be used to indicate which type of circuitry has been disabled, e.g., a first color for a camera, a second color for both a camera and microphone, a third color for a microphone only, etc. This may allow users to quickly determine the status of controlled circuitry. The indicator signal may be controlled by SEP 130 or may be otherwise connected to determine the status of circuitry (e.g., by being connected to a power rail for circuitry being controlled by SEP 130, in clock gating embodiments). In some embodiments, various logic with status information for one or more sensors as input may be used to indicate more general information, e.g., an indicator that indicates generally whether or not privacy is secured for device 100 based on whether a certain combination of sensors is enabled or disabled.

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 7:
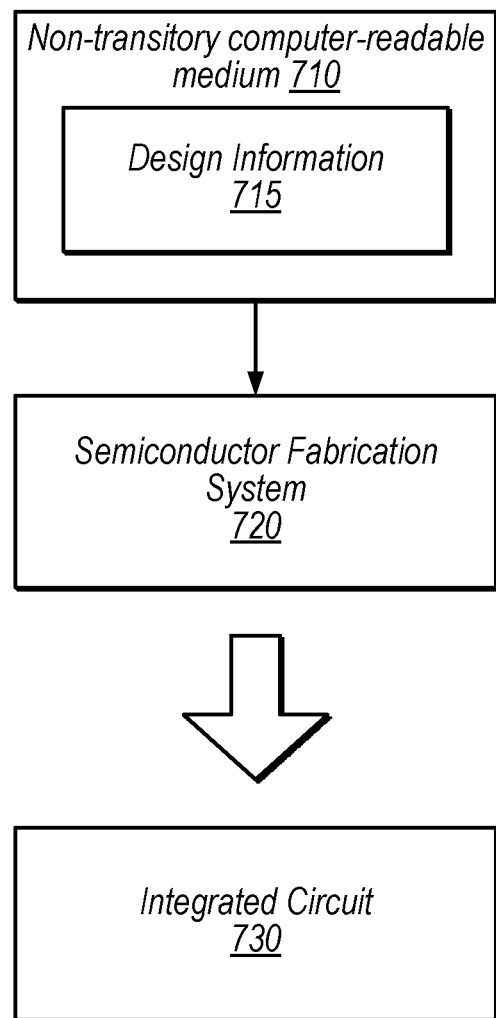
FIG. 7 is a block diagram illustrating an exemplary computer-readable medium that stores design information, according to some embodiments.

FIG. 7 is a block diagram illustrating an exemplary non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable medium 710, may comprise any of various appropriate types of memory devices or storage devices. Medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 710 may include other types of non-transitory memory as well or combinations thereof. Medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabrication at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730. In some embodiments, the design information is specified in whole or in part in the form of a netlist that specifies cell library elements and their connectivity.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1-3. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Additional Exemplary Embodiments

In some embodiments, a non-transitory computer-readable medium has instructions stored thereon that are executable by a secure circuit in a computing device to perform operations comprising: determining to disable one or more sensors, wherein the computing device includes a processor configured to access data generated by the one or more sensors and a gating circuit configured to provide signals to the one or more sensors, wherein the computing device is configured not to allow access to hardware resources of the secure circuit other than via signals sent to a predefined subset of circuitry included in the secure circuit, and wherein management of a control signal for the gating circuit is limited to the secure circuit; and setting the control signal to a first value to disable the one or more sensors such that other elements of the computing device cannot enable the one or more sensors until the secure circuit changes the control signal from the first value to a second value.

In some embodiments, a non-transitory computer readable storage medium has stored thereon design information that specifies a design of at least a portion of a hardware integrated circuit in a format recognized by a semiconductor fabrication system that is configured to use the design information to produce the circuit according to the design, including: a processor configured to access data generated by one or more sensors; a gating circuit configured to provide signals to the one or more sensors; and a secure circuit, wherein the circuit is configured not to allow access to hardware resources of the secure circuit other than via signals sent to a predefined subset of circuitry included in the secure circuit; wherein circuit is configured such that management of a control signal for the gating circuit is limited to the secure circuit, wherein a first value of the control signal disables the one or more sensors such that other elements of the circuit cannot enable the one or more sensors when the secure circuit sets the control signal to the first value.

In some embodiments, an apparatus comprises: a gating circuit configured to provide signaling to a first circuit; and a secure circuit, wherein the apparatus is configured not to allow access to hardware resources of the secure circuit other than via signals sent to a predefined subset of circuitry included in the secure circuit; wherein the apparatus is configured such that management of a control signal input to the gating circuit is limited to the secure circuit, wherein a first value of the control signal disables signaling to the first circuit such that other elements of the apparatus cannot enable first circuit when the secure circuit sets the control signal to the first value.

Although specific embodiments have been described above and have been depicted in the accompanying appendix below, these embodiments are not intended to limit the scope of the present disclosure, even where only a single embodiment is described with respect to a particular feature. Examples of features provided in the disclosure are intended to be illustrative rather than restrictive unless stated otherwise. For example, references to the term "car" may encompass any suitable vehicle (or even other devices that can receive commands from a mobile device). As another example, references to the term "phone" may encompass any suitable mobile device. Accordingly, the above and below descriptions are intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The present disclosure further contemplates that the entities responsible for the collection, analysis, disclosure, transfer, storage, or other use of personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of biometric authentication, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services.

What is claimed is:

1. An apparatus, comprising:
   a secure circuit;
   a processor configured to access data generated by one or more sensors via a data path that does not include the secure circuit;
   a gating circuit configured to provide signaling to the one or more sensors; and
   wherein the apparatus is configured to allow access to hardware resources of the secure circuit to other elements of the apparatus, including the processor, only via a predefined subset of circuitry in the secure circuit;
   wherein management of a hardware control signal input to the gating circuit is limited to the secure circuit, wherein assertion of a first value of the control signal by the secure circuit disables the one or more sensors, and wherein other elements of the apparatus, including the processor, cannot enable the one or more sensors when the secure circuit has asserted the first value of the control signal; and
   wherein the secure circuit is configured to control the gating circuit to assert the first value of the control signal to disable the one or more sensors in response to detecting that the apparatus has a particular physical orientation.

2. The apparatus of claim 1, wherein the gating circuit is a power gating circuit.

3. The apparatus of claim 1, wherein the gating circuit is a clock gating circuit.

4. The apparatus of claim 1, wherein the gating circuit is a control gating circuit.

5. The apparatus of claim 1, wherein the gating circuit is configured to disable communications of sensor data from the one or more sensors to other elements of the apparatus based on the first value of the control signal.

6. The apparatus of claim 1, wherein the secure circuit is configured to disable the one or more sensors in response to the apparatus entering a predetermined location.

7. The apparatus of claim 1, wherein the secure circuit is configured to unconditionally disable the one or more sensors for a specified time interval subsequent to input requesting disablement of the one or more sensors.

8. The apparatus of claim 1, wherein the secure circuit is configured to enable the one or more sensors only in response to the secure circuit authenticating one or more biometric credentials from a user of the apparatus.

9. The apparatus of claim 8, wherein the secure circuit is configured to require re-authentication after a time interval has elapsed subsequent to authentication of the one or more biometric credentials and disable the one or more sensors based on failure to re-authenticate.

10. The apparatus of claim 1, wherein the one or more sensors include one or more of a camera or an audio input module.

11. The apparatus of claim 1, wherein the apparatus is configured to implement a profile in which the secure circuit is configured to maintain the control signal at the first value and wherein implementation of the profile is required for access to a network.

12. The apparatus of claim 11, wherein the apparatus is configured to operate in at least a closed physical configuration and an open physical configuration and wherein the secure circuit is configured to control the gating circuit to assert the first value of the control signal to disable the one or more sensors in response to detecting that the apparatus is in the closed physical configuration.

13. A method, comprising:
- accessing, by a processor of the computing device, data generated by one or more sensors via a data path that does not include a secure circuit of the computing device;
- providing, by a gating circuit, signaling to the one or more sensors;
- allowing, by the computing device, access to hardware resources of the secure circuit to other elements of the computing device, including the processor, only via a predefined subset of circuitry included in the secure circuit, wherein management of a hardware control signal input to the gating circuit is limited to the secure circuit;
- determining, by the secure circuit in response to detecting that the computing device has a first physical orientation, to disable the one or more sensors; and
- setting, by the secure circuit in response to the determining, the control signal to a first value to disable the one or more sensors, wherein other elements of the computing device, including the processor, cannot enable on the one or more sensors until the secure circuit changes the control signal from the first value to a second value.

14. A non-transitory computer-readable medium having instructions stored thereon that are executable by a computing device to perform operations comprising:
- receiving user input requesting disabling of one or more sensors of the computing device; and
- sending one or more signals to a predefined subset of circuitry included in a secure circuit, wherein the computing device includes a processor configured to access data generated by the one or more sensors via a data path that does not include the secure circuit and a gating circuit configured to provide signaling to the one or more sensors, wherein the computing device is configured to allow access to hardware resources of the secure circuit to other elements of the computing device, including the processor, only via signals sent to the predefined subset, and wherein management of a hardware control signal for the gating circuit is limited to the secure circuit, wherein the sending is performed in response to detecting that the computing device has a first physical orientation;
- wherein the one or more signals cause the secure circuit to set the control signal to a first value to disable the one or more sensors, wherein other elements of the computing device, including the processor, cannot enable the one or more sensors until the secure circuit changes the control signal from the first value to a second value.

15. The non-transitory computer-readable medium of claim 14, wherein, to disable the one or more sensors, the gating circuit is configured to gate one or more of:
- power to the one or more sensors;
- a clock to the one or more sensors; or
- control information to the one or more sensors.

16. The non-transitory computer-readable medium of claim 14, wherein the one or more sensors include one or more of a camera or an audio input module.

* * * * *